(12) United States Patent
Okuda et al.

(10) Patent No.: US 10,228,087 B2
(45) Date of Patent: Mar. 12, 2019

(54) METHOD FOR PACKING FILLER MATERIAL

(71) Applicants: ASHIMORI INDUSTRY CO., LTD., Osaka-shi (JP); ASHIMORI ENGINEERING CO., LTD., Chiyoda-ku (JP)

(72) Inventors: Susumu Okuda, Settsu (JP); Ichiro Kusuba, Settsu (JP); Koji Aso, Settsu (JP)

(73) Assignees: ASHIMORI INDUSTRY CO., LTD., Osaka-shi (JP); ASHIMORI ENGINEERING CO., LTD., Chiyoda-ku (JP)

(*) Notice: Subject to any disclaimer, the term of this patent is extended or adjusted under 35 U.S.C. 154(b) by 0 days.

(21) Appl. No.: 15/517,832

(22) PCT Filed: Oct. 10, 2014

(86) PCT No.: PCT/JP2014/077240
§ 371 (c)(1),
(2) Date: Apr. 7, 2017

(87) PCT Pub. No.: WO2016/056133
PCT Pub. Date: Apr. 14, 2016

(65) Prior Publication Data
US 2017/0314721 A1    Nov. 2, 2017

(51) Int. Cl.
*F16L 55/18*    (2006.01)
*F16L 55/1645*    (2006.01)
(Continued)

(52) U.S. Cl.
CPC .......... *F16L 55/1645* (2013.01); *B29C 63/34* (2013.01); *E21D 11/38* (2013.01);
(Continued)

(58) Field of Classification Search
CPC ...... F16L 55/1645; F16L 55/175; E21F 15/00
(Continued)

(56) References Cited

U.S. PATENT DOCUMENTS 2,096,850 A * 10/1937 Forsberg ................. E21D 11/10
249/11
4,678,370 A * 7/1987 Allen ....................... E03F 3/06
138/154
(Continued)

FOREIGN PATENT DOCUMENTS

JP    63-35999 A    2/1988
JP    2000-96989 A    4/2000
(Continued)

OTHER PUBLICATIONS

International Preliminary Report on Patentability and Written Opinion dated Apr. 11, 2017 in PCT/JP2014/077240 (with English translation).
(Continued)

*Primary Examiner* — James Hook
(74) *Attorney, Agent, or Firm* — Oblon, McClelland, Maier & Neustadt, L.L.P.

(57) ABSTRACT

A method for filling a gap with a filler material, enabling prevention of inflow of the filler material into an air removing tool through its opening before complete removal of air from the gap, and enabling uniform filling of the gap with the filler material. The gap is between an existing conduit and a lining material provided inside the existing conduit. The method includes: inserting an air removing tool into an air removing hole bored through the lining material, and bringing a leading end face of the air removing tool into contact with the inner circumferential surface of the existing conduit; and injecting the filler material into the gap while expelling air from the gap through a leading end of the air removing tool, the air removing tool including, at its leading
(Continued)

end, an air removing portion through which air is discharged.

7 Claims, 12 Drawing Sheets

(51) Int. Cl.
*B29C 63/34* (2006.01)
*F16L 55/165* (2006.01)
*F16L 55/175* (2006.01)
*E21D 11/38* (2006.01)
*E21F 15/00* (2006.01)
*B29K 105/16* (2006.01)
*B29K 105/18* (2006.01)

(52) U.S. Cl.
CPC .......... *E21F 15/00* (2013.01); *F16L 55/1656* (2013.01); *F16L 55/175* (2013.01); *B29K 2105/165* (2013.01); *B29K 2105/18* (2013.01)

(58) Field of Classification Search
USPC .................. 138/97, 98; 405/150.1, 184.2
See application file for complete search history.

(56) References Cited

U.S. PATENT DOCUMENTS

| | | | | |
|---|---|---|---|---|
| 4,956,032 A | * | 9/1990 | Hahn | ........................ E03F 3/06 138/97 |
| 5,141,363 A | * | 8/1992 | Stephens | ................. B28C 5/386 366/10 |
| 6,167,913 B1 | * | 1/2001 | Wood | ...................... B29C 63/34 138/97 |
| 2004/0173272 A1 | * | 9/2004 | Yoo | ........................... E03F 3/06 138/98 |

FOREIGN PATENT DOCUMENTS

| | | |
|---|---|---|
| JP | 2001-323785 A | 11/2001 |
| JP | 2010-163830 A | 7/2010 |
| KR | 10-2009-0020416 A | 2/2009 |

OTHER PUBLICATIONS

International Search Report dated Jan. 13, 2015, in PCT/JP2014/077240 filed Oct. 10, 2014.
Extended European Searth Report dated Jun. 1, 2018 in European Patent Application No. 14903550.3, 8 pages.
Russian Office Action dated Jun. 15, 2018 in Russian Patent application No. 2017115938, 9 pages (with English translation).

* cited by examiner

METHOD FOR PACKING FILLER MATERIAL

TECHNICAL FIELD

The present invention relates to a method for filling a gap with a filler material, the gap being between an existing conduit and a lining material provided inside the conduit.

BACKGROUND ART

Known methods for filling a gap between an existing conduit and a lining material provided inside the conduit include, for example, a method described in Patent Literature 1. This document describes a method for filling a gap with a filler material, the gap being between an existing conduit and a liner structure fixed inside the conduit. According to this method, an air removing tool is fitted into an air removing hole bored through the liner structure, and the filler material is injected through a filling port while air in the gap is discharged through an opening at a leading end (inserted end) of the air removing tool. The leading end portion of the tool has a shape like a bamboo spear ("bamboo-spear shape"). The filler material enters the air removing tool when the level of the filler material injected in the gap reaches the opening of the tool, and the filler material having entered the tool exits through a rear end (end opposite to the leading end) of the tool. Patent Literature 1 describes that the outflow of the filler material from the tool indicates the fill level of the filler material in the gap.

Patent Literature 2 describes an air removing tool used to discharge air remaining in a gap between a primary liner inside an existing conduit and a secondary liner inside the primary liner during the process of filling the gap with a filler material. The air removing tool includes: an air removing pipe having a leading end portion of a bamboo-spear shape; a socket having upper and lower open ends, an upper portion of the socket being fitted to a rear end of the air removing pipe; a ball valve for removing air; and a fitting, an upper portion thereof fitted to the lower portion of the socket and a lower portion thereof attached to the ball valve by screwing. The fitting of the air removing tool is screwed into an air removing hole bored through the secondary liner, and thereby the air removing tool is firmly attached to the secondary liner. The leading end of the air removing pipe is able to be brought into contact with an inner circumferential surface of the primary liner, and air in the gap is discharged through an opening of the pipe.

CITATION LIST

Patent Literature

Patent Literature 1: Japanese Unexamined Patent Publication No. 2001-323785
Patent Literature 2: Japanese Unexamined Patent Publication No. 2000-96989

SUMMARY OF INVENTION

Technical Problem

In each of the air removing tools described in Patent Literatures 1 and 2, the open leading end portion of the tool has a bamboo-spear shape, i.e., the leading end portion is pointed. Although these known documents each describes that the air removing tool is brought into contact with the inner surface of the conduit, only the pointed leading end of the bamboo-spear-like air removing tool is in contact with the inner surface. Due to this, there is a possibility that the filler material enters the inside of the air removing tool through the opening at the leading end portion before air remaining in the vicinity of the inner surface of the conduit is completely removed. To be more specific, when the level of the filler material injected in the gap reaches the level of the bamboo-spear-shape portion of the air removing tool as the injection of the filler material proceeds, the filler material may enter the inside of the tool. Once the filler material enters the inside of the air removing tool, it is difficult to discharge the air remaining in the vicinity of the inner surface of the conduit in the gap. The air remaining in the gap functions as a hollow, which means that the gap is not uniformly filled with the filler material. This may lead to reduction in strength at a portion between the existing conduit and the liner structure.

The present invention has been made under the above-described circumstances. An object of the present invention is to provide a method for filling a gap with a filler material, the method enabling prevention of inflow of the filler material into an air removing tool through its opening before complete removal of air from the gap, and enabling uniform filling of the gap with the filler material.

Solution to Problem and Advantageous Effects of Invention

According to a first aspect of the invention, there is provided a method for filling a gap with a filler material, the gap being between an existing conduit and a lining material provided inside the existing conduit. The method includes: an air removing tool attaching step of inserting an air removing tool into an air removing hole bored through the lining material, and bringing a leading end face of the air removing tool into contact with an inner circumferential surface of the existing conduit; and a filling step of injecting the filler material into the gap while expelling air from the gap through a leading end of the air removing tool, the air removing tool including, at the leading end thereof, an air removing portion through which air is discharged. Here, the leading end face of the air removing tool is a surface along the circumference of the leading end of the air removing tool. Further, "bringing the leading end face into contact with the inner circumferential surface of the existing conduit" means to bring the leading end face into contact with the inner circumferential surface throughout the substantially entire circumference of the leading end face.

In the above aspect of the present invention, the air removing tool is secured with its leading end face being in contact with the inner circumferential surface of the existing conduit. Further, the air removing tool includes, at its leading end, the air removing portion through which air is discharged. These features enable air in the gap to be discharged through the air removing portion before the filler material enters the air removing tool. As a result, the gap is uniformly filled with the filler material, and air in the gap is completely removed. When stagnant water exists in the gap, the stagnant water is discharged with air, in the same way.

According to a second aspect of the invention, the method of the first aspect is arranged such that the leading end face of the air removing tool is brought closer to the inner circumferential surface of the existing conduit from a position near the lining material depending on a fill level of the filler material in the filling step, and then brought into contact with the inner circumferential surface of the existing conduit.

In the above aspect of the present invention, the leading end face of the air removing tool is brought closer to the inner circumferential surface of the existing conduit during the filling step. When a large amount of air and stagnant water exist in the gap, it is possible to discharge the existing fluid through an opening at the leading end of the tool, by holding the leading end face of the air removing tool in the gap with no contact with the inner circumferential surface of the existing conduit, at an early stage of the filling step. This facilitates smooth discharge of the large amount of air and stagnant water. The leading end face of the air removing tool is brought into contact with the inner circumferential surface after the discharged fluid becomes similar to the filler material in composition, and thereby the air and stagnant water remaining in a portion of the gap that corresponds to the moving distance of the leading end face are completely removed through the air removing portion at the leading end of the air removing tool. The air and stagnant water in the gap are more efficiently and completely removed by moving the leading end face toward the inner circumferential surface in multiple times in the filling step (i.e., the leading end of the air removing tool is brought closer to the inner circumferential surface of the existing conduit in a stepwise manner).

According to a third aspect of the invention, the method of the first or second aspect further includes an additional filling step of lowering the air removing tool so that the leading end of the air removing tool is level with the air removing hole after the filling step is completed, and then injecting the filler material into the gap, an amount of the injected filler material corresponding to a volume of a portion of the air removing tool that is located in the gap when the leading end face contacts the inner circumferential surface.

In this aspect of the present invention, after the filling step is stopped, the additional filling step is performed, in which the air removing tool is lowered so that its leading end is level with the air removing hole, and the filler material is injected into the gap. The amount of the injected filler material corresponds to the volume of the portion of the air removing tool that is located in the gap when the leading end face contacts the inner circumferential surface. This eliminates the formation of a void at the location where the air removing tool is inserted in the gap, and enables defect-free and uniform filling of the gap with the filler material, without any hollow. This prevents reduction in strength at a portion between the inner circumferential surface of the existing conduit and the outer circumferential surface of the lining material.

According to a fourth aspect of the invention, the method of any one of the first to third aspects is arranged such that the air removing hole, the number of which is at least one, is bored through the lining material as necessary.

In the above aspect of the present invention, the at least one air removing hole is able to be bored at a freely-selected position before or after the lining material is provided in the conduit. Thus, it is possible to change the number of the air removing tools, even after the lining material has already been provided in the conduit. This makes it possible to flexibly address a design change made based on the situation on site. For example, it is possible to open the air removing hole at a portion opposing a part of the existing conduit where air tends to be retained, e.g., at an upside-down V-shape part of the existing conduit. Two or more air removing holes may be bored.

According to a fifth aspect of the invention, the method of any one of the first to fourth aspects is arranged such that the air removing portion is formed by at least one cut groove.

In the above aspect of the present invention, the air removing portion is formed by at least one cut groove. Because the cut groove is configured to be located close to the inner circumferential surface of the existing conduit, air and stagnant water in the gap are able to be discharged completely. Furthermore, by adjusting the depth of the cut groove, the discharge amount per unit time is controllable.

According to a sixth aspect of the invention, the method of any one of the first to fifth aspects is arranged such that the air removing tool includes a tapered surface provided on an outer circumference of the leading end of the air removing tool.

In the above aspect of the present invention, the air removing tool includes the tapered surface on the outer circumference of the leading end of the tool. The inner circumferential surface of the existing conduit made of concrete or the like is rough. Because of this, there happens to be a natural gap between the inner circumferential surface of the existing conduit and the leading end face of the air removing tool brought into contact with the inner circumferential surface. Now, reference is made to FIG. 11 which shows an embodiment of the present invention at the left and a comparative example at the right. In the embodiment, even a slight amount of remaining air and stagnant water is smoothly introduced into the air removing tool along the tapered surface provided on the outer circumference of the leading end of the air removing tool.

DESCRIPTION OF EMBODIMENTS

Figure 1:
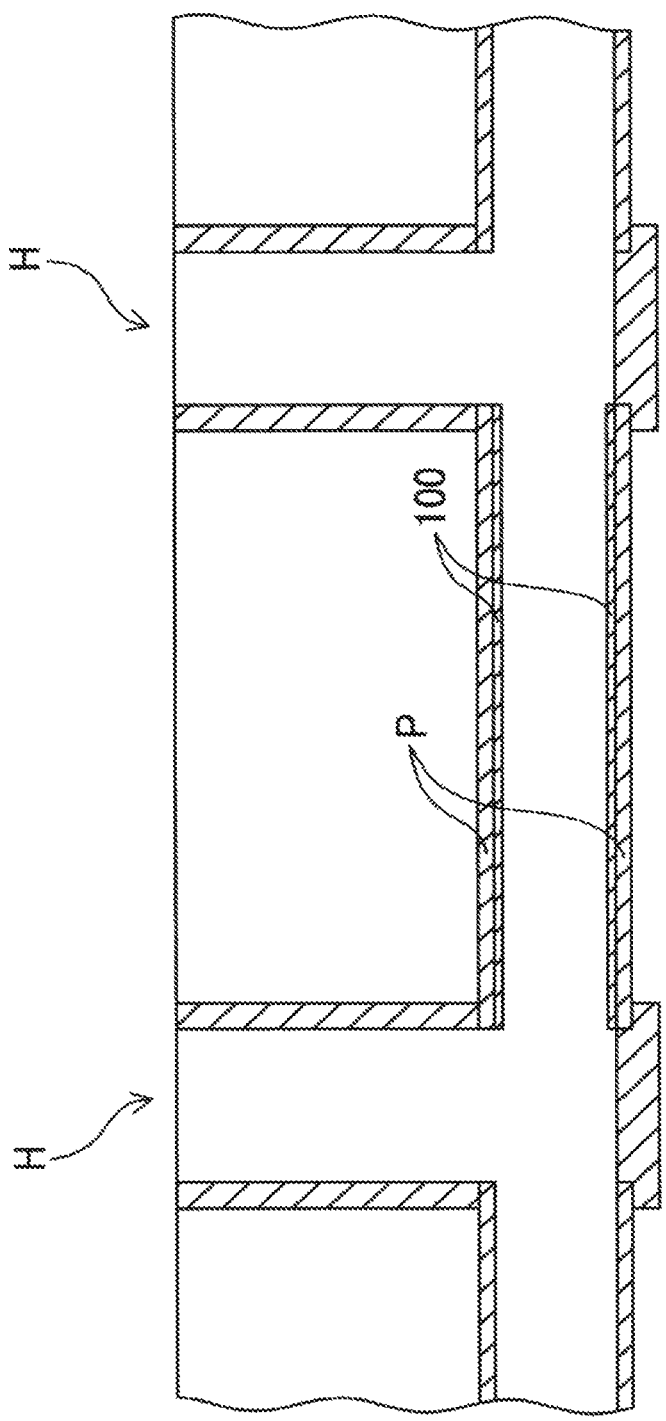
FIG. 1 is a sectional view of an existing conduit lined with a lining material taken along a vertical plane including a lengthwise direction of the conduit.
Figure 2:
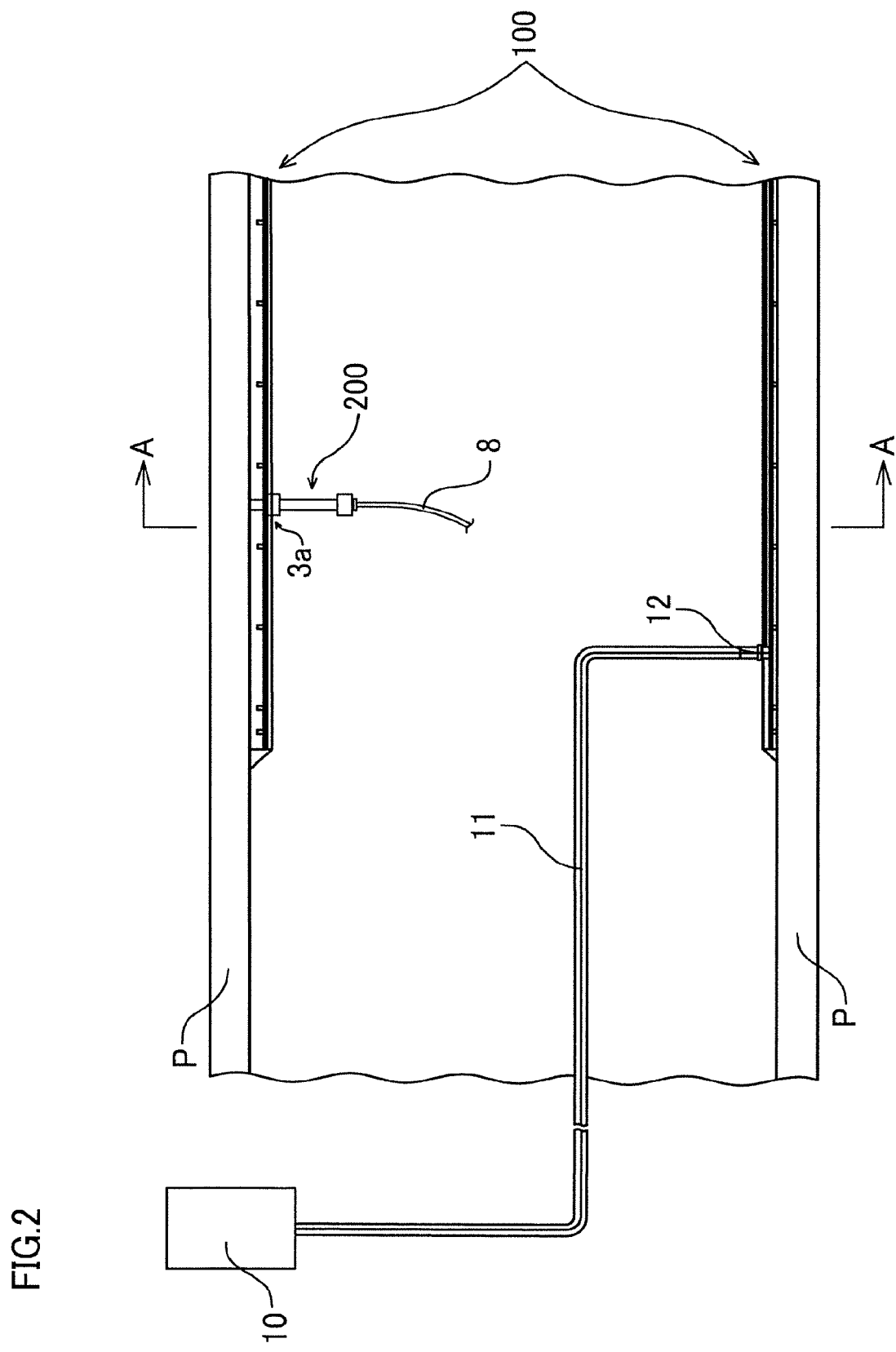
FIG. 2 is a sectional view of a main part of the existing conduit to which the present invention is applied, taken along a vertical plane including the lengthwise direction of the conduit.

The following will describe an embodiment of the present invention. As shown in FIG. 1, the present embodiment is an example in which the present invention is applied to repair an existing conduit P such as an underground sewer pipe. A variety of components of a lining material 100 are carried into the existing conduit P through a manhole H or a pit, and the components are assembled to structure the lining material 100. The lining material 100 is provided in a predetermined section of the existing conduit P, substantially along the inner surface of the conduit P throughout its entire circumference. As shown in FIG. 2, end portions of the lining material 100 are sealed with rapid hardening mortar, for example. Thereafter, at least one air removing hole 3a, air removing tool 200, discharge hose 8, filling port 12, filling hose 11, and a filling pump 10 are provided. Then, a filler material is injected into a gap between the existing conduit P and the lining material 100.

First of all, the structure of the lining material 100 and the air removing tool 200 used in the present invention will be described.

(Lining Material)

Figure 3:
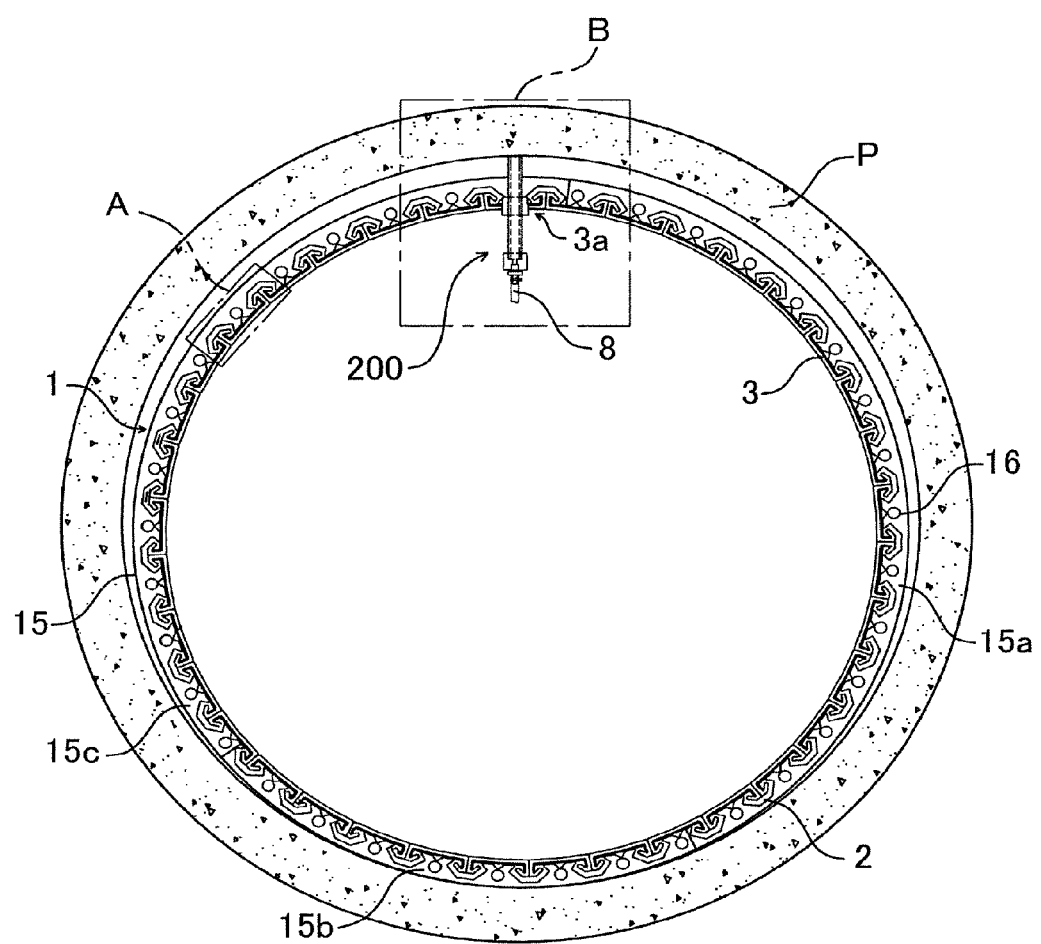
FIG. 3 is a cross section taken along A-A in FIG. 2.

The lining material 100 is used for reinforcing the existing conduit P. As shown in FIG. 2 and FIG. 3, the lining material 100 includes a reinforcing body 1, fitting members 2, and inner surface members 3. The reinforcing body 1 includes reinforcing members 15 arranged in a lengthwise direction of the existing conduit P. The fitting members 2 are interposed between the reinforcing body 1 and the inner surface members 3. The inner surface members 3 are attached to an inner circumferential surface of the reinforcing body 1.

Figure 4:
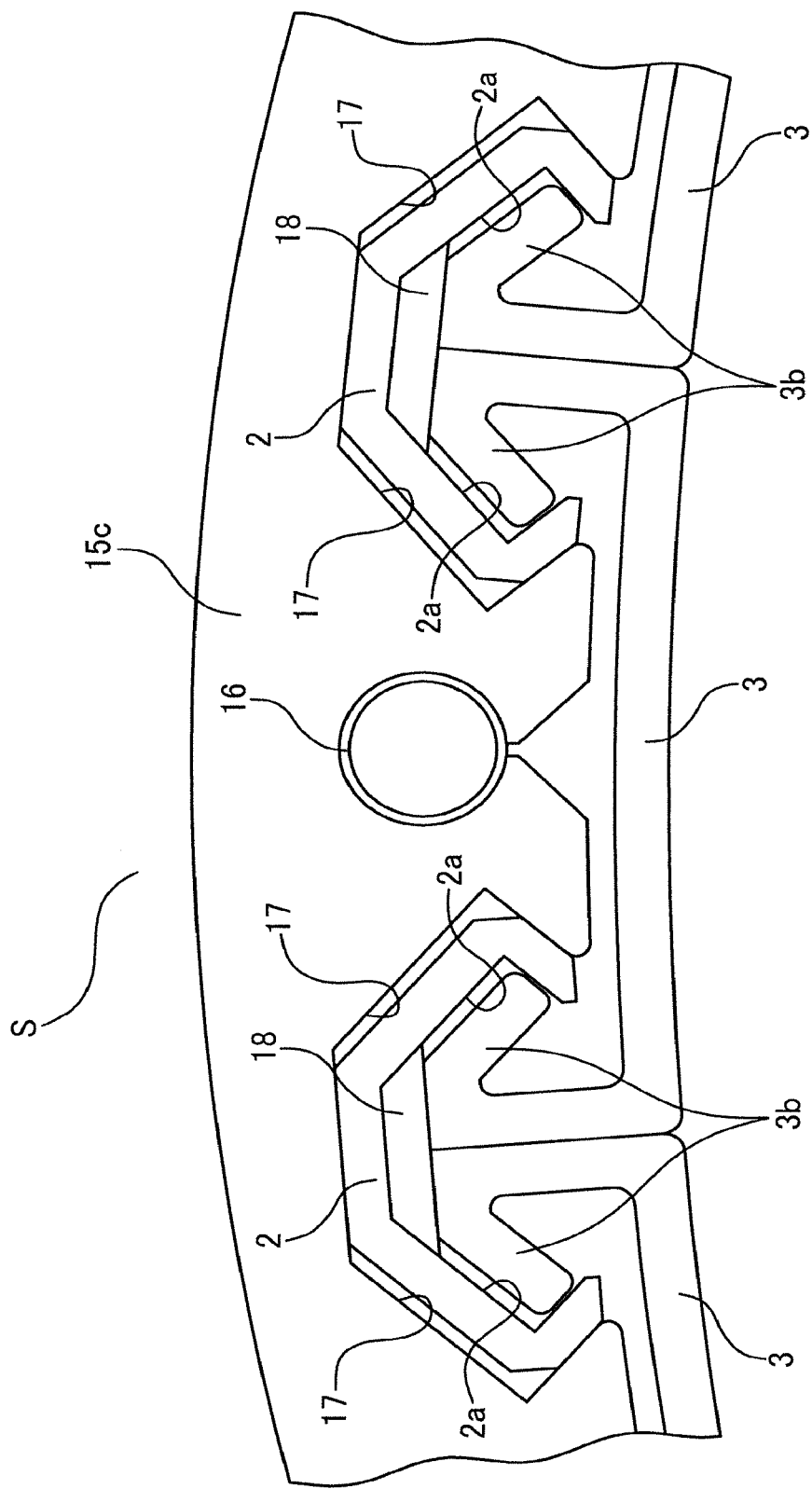
FIG. 4 is an enlarged view of a part A in FIG. 3.

The reinforcing body 1 is formed by the plurality of annular reinforcing members 15. Each reinforcing member 15 is formed by three arc-shaped reinforcing components 15a, 15b, and 15c, which are to be arranged along a left portion, right portion, and lower portion of the inner circumferential surface of the existing conduit P, respectively. The reinforcing components 15a to 15c are connected to one another by connecting members (not illustrated) in a circumferential direction. Each reinforcing member 15 is made of carbon steel, stainless steel, rigid synthetic resin, or the like, for example. The reinforcing members 15 are arranged apart from one another in the lengthwise direction of the existing conduit P, and each two reinforcing members 15 adjacent to each other are connected to each other by a plurality of pipe-like connecting members 16. As shown in FIG. 4, a plurality of recesses 17 are provided on the inner circumferential surface of each reinforcing member 15. The recesses 17 are apart from each other in the circumferential direction. Into the recesses 17, the fitting members 2 are fitted, respectively.

Each fitting member 2 is long in the lengthwise direction of the existing conduit P. Each fitting member 2 is attached to the reinforcing members 15 so as to extend over the reinforcing members 15. A cross-section of each fitting member 2 taken orthogonally to the lengthwise direction of the fitting member 2 has an angular C-shape similar to the shape of each recess 17 of the reinforcing members 15. The space inside the C-shape fitting member 2 functions as a recessed first fitting portion 2a into which end portions of the later-described inner surface members 3 are fitted. The fitting members 2 are attached to the reinforcing body 1 so that the first fitting portion 2a of each fitting member 2 opens toward the center of the existing conduit P. The attached fitting members 2 are arranged side by side in the circumferential direction. At a bottom portion of each first fitting portion 2a, a sealing member 18 is provided for sealing the gap between the fitting member 2 and the inner surface members 3. Each fitting member 2 is made of, for example, thermoplastic resin such as polyethylene resin. The inner surface members 3 are attached to the inner circumferential surface of the reinforcing body 1 via the fitting members 2.

Each inner surface member 3 has a substantially U-shape cross section and has two projecting second fitting portions 3b which are respectively at both circumferential end portions of the inner surface member 3. Into the first fitting portion 2a of each fitting member 2, a corresponding pair of second fitting portions 3b in contact with each other are inserted, the pair of second fitting portions 3b respectively belonging to two inner surface members 3 adjacent to each other in the circumferential direction. Because the projecting end portions of the pair of second fitting portions 3b are fitted in the first fitting portion 2a, the inner surface members 3 are fixed to the reinforcing body 1. The inner surface members 3 are attached to the reinforcing body 1 so as to be arranged side by side in the circumferential direction, with the result that the inner circumferential surface of the existing conduit P is air-tightly covered with the inner surface members 3. Each inner surface member 3 is made of, for example, thermoplastic resin such as polyethylene resin.

There is a gap S between: the inner circumferential surface of the existing conduit P; and the reinforcing body 1 with the fitting members 2 and the inner surface members 3 attached thereto. The gap S is filled with a filler material which will be described later.

(Air Removing Tool)

Figure 9:
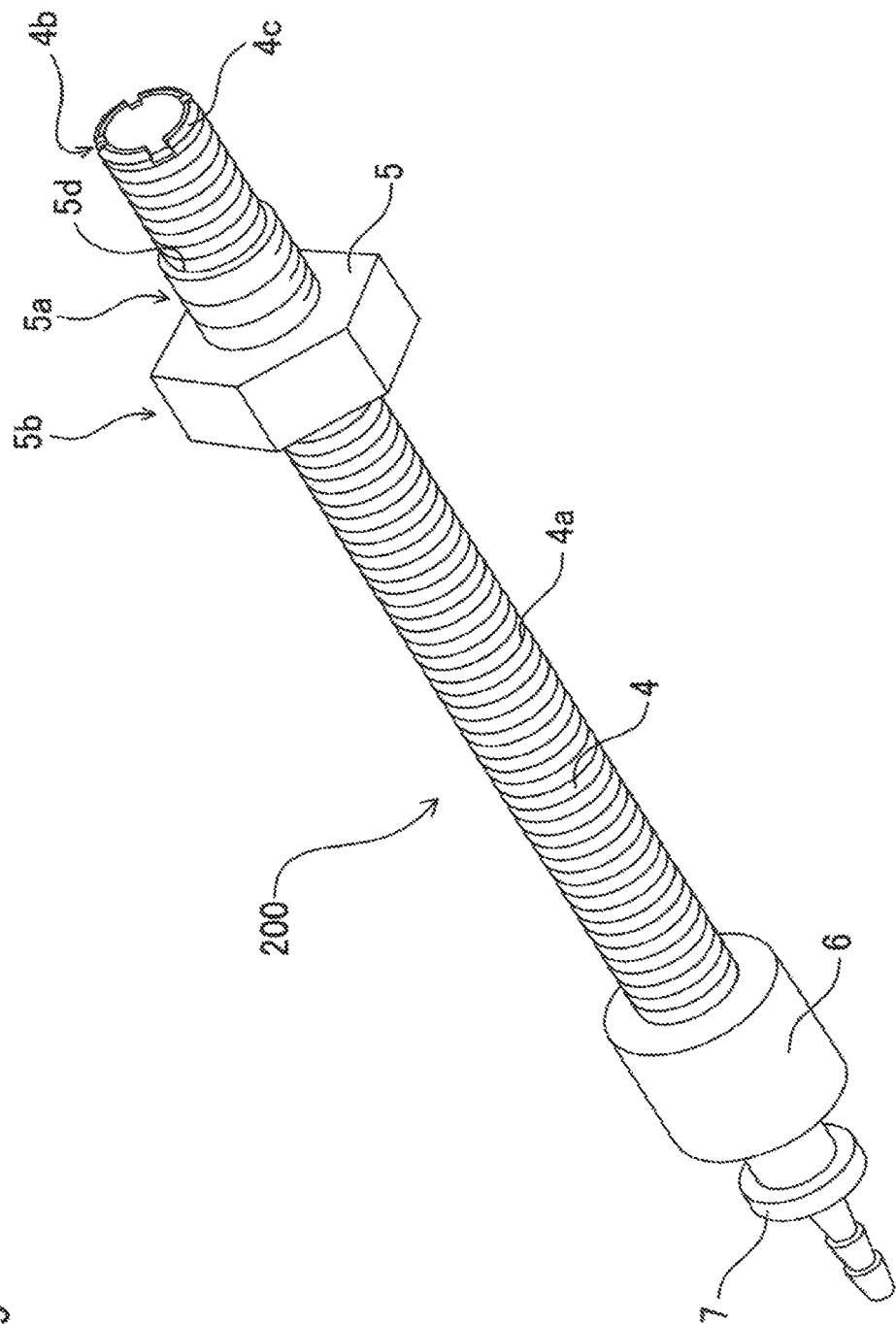
FIG. 9 is a perspective view of an air removing tool.

The air removing tool 200 is used to discharge air and stagnant water in the gap S. As shown in FIG. 9, the air removing tool 200 includes: a cylindrical body 4, a threaded nut 5, a screw thread adapter 6; and a hose nipple 7.

The cylindrical body 4 has a cylindrical shape. The length of the cylindrical body 4 is longer than the distance from the inner circumferential surface of the existing conduit P to the inner circumferential surface of the inner surface members 3. The cylindrical body 4 has a threaded portion 4a on its outer circumferential surface. The cylindrical body 4 has, at its one end, an annular leading end face cut orthogonally to the axis of the cylindrical body 4. The cylindrical body 4 also has a tapered surface 4c on the outer circumference of the one end. The tapered surface 4c is formed by cutting off the outer edge of the leading end face, for example, by chamfering or rounding off the outer edge. The cylindrical body 4 is provided with an air removing portion at the one end. In the illustrated embodiment, the air removing portion is formed by cut grooves 4b. The number of the cut grooves 4b is four and the cut grooves 4b are provided at intervals of 90 degrees. The depth of each cut groove 4b may be freely determined as long as air and stagnant water can pass through the cut groove 4b. Furthermore, the number of the cut grooves 4b is not limited to four. In addition, the intervals between the cut grooves 4b do not have to be constant. The cylindrical body 4 is made of stainless steel, for example. The threaded nut 5 is attached to the outer circumference of the cylindrical body 4.

The threaded nut 5 is configured to attach the cylindrical body 4 to the air removing hole 3a bored through the inner surface member 3. The inner circumferential surface of the threaded nut 5 is threaded to form a threaded portion 5d with a pitch the same as that of the threaded portion 4a provided on the outer circumferential surface of the cylindrical body 4. Each threaded portion preferably has a trapezoidal thread form which tends to provide high precision with respect to the axial direction. The threaded portion 5d on the inner circumferential surface of the threaded nut 5 is configured to be screwed with the threaded portion 4a on the outer circumferential surface of the cylindrical body 4. Due to this, the threaded nut 5 is attached to the cylindrical body 4. The threaded nut 5 includes a nut upper portion 5a and a nut lower portion 5b. A threaded portion 5c is provided on the outer circumferential surface of the nut upper portion 5a. The threaded portion 5c has a pitch the same as that of a threaded portion 3b of the air removing hole 3a. The pitch of the threaded portion 5c on the outer circumferential surface of the nut upper portion 5a may be the same as or may be different from the pitch of the threaded portion 5d on the inner circumferential surface of the threaded nut 5. The threaded portion 5c on the outer circumferential surface of the nut upper portion 5a is configured to be screwed with the threaded portion 3b of the air removing hole 3a. Due to this, the threaded nut 5 is attached to the inner surface member 3. Because of the above arrangements, the cylindrical body 4 attached to the threaded nut 5 is movable vertically relative to the inner surface member 3. It is preferable that the length of the nut upper portion 5a is longer than the thickness of the inner surface member 3. This enables the threaded nut 5 to be attached to the inner surface member 3 by screwing the threaded nut 5 with the inner surface member 3 throughout the thickness of the inner surface member 3. Meanwhile, the nut lower portion 5b has a hexagonal external shape, and the outer diameter of the nut lower portion 5b is at least larger than the outer diameter of the nut upper portion 5a. This enables the threaded nut 5 to be screwed with the inner surface member 3 while being strongly pressed onto the inner surface member 3. As a result, the threaded nut 5 is firmly secured to the inner surface member 3. Consequently, the air removing tool 200 is firmly secured to the inner surface member 3, and this prevents detachment of the air removing tool 200 during the operation. It should be noted that the external shape of the nut lower portion 5b does not have to be the hexagonal shape. For example, the external shape may be an octagonal shape. The threaded nut 5 is made of stainless steel, for example. The screw thread adapter 6 having upper and lower open ends is attached to the other end of the cylindrical body 4.

The screw thread adapter 6 is configured to connect the cylindrical body 4 and an end of the hose nipple 7, which are different from each other in outer diameter. The hose nipple 7 is attached to the cylindrical body 4 via the screw thread adapter 6.

The hose nipple 7 is configured to attach one end of the discharge hose 8 to the air removing tool 200. Through the hose 8, air and stagnant water are discharged. Note that a vacuum pump (not illustrated) may be coupled to the other end of the discharge hose 8, to actively discharge air and stagnant water. The screw thread adapter 6 and the hose nipple 7 may be unitarily formed as a single member.

The following describes a lining step for structuring the lining material 100, and various steps performed using the air removing tool 200.

(Lining Step)

In the lining step, the lining material 100 is provided in the existing conduit P. The lining step is performed before an air removing tool attaching step which will be described later.

As shown in FIG. 3, the reinforcing members 15 are arranged along the inner circumferential surface of the existing conduit P. Each reinforcing member 15 is assembled by connecting three reinforcing components 15a to 15c in the circumferential direction in the existing conduit P. The plurality of reinforcing members 15 are connected to one another by the connecting members 16 in the lengthwise direction of the existing conduit P, with the result that the cylindrical reinforcing body 1 is formed.

The fitting members 2 are fitted into the recesses 17 of the reinforcing members 15. Furthermore, into the first fitting portion 2a of each fitting member 2, a corresponding pair of second fitting portions 3b are inserted and fitted, the second fitting portions 3b respectively belonging to two inner surface members 3 adjacent to each other in the circumferential direction. The inner surface members 3 are attached to the cylindrical reinforcing body 1 throughout its entire circumference in this way. As a consequence, the inner circumferential surface of the existing conduit P is covered with the inner surface members 3. As such, the lining material 100 is provided in the existing conduit P.

(Filling Hose Attaching Step)

As shown in FIG. 2, after the lining material 100 is provided, the one or more filling ports 12 are provided through a lower portion of the lining material 100. The filling ports 12 are provided using a drill, for example. In this embodiment, the number of the filling ports 12 provided through the lining material 100 is more than one. The filling ports 12 are provided at constant intervals in the lengthwise direction of the lining material 100. The intervals are determined based on the distance for which filling is possible. The intervals between the filling ports 12 do not have to be constant. Each filling port 12 is configured to be closed by a cap (not illustrated), for example. The filling hose 11 is attached to the filling port 12. The filling hose 11 is configured to connect the filling pump 10 and the filling port 12. One end of the filling hose 11 is attached to the filling port 12 and the other end of the filling hose 11 is attached to the filling pump 10. As such, the lining material 100 is coupled to the filling pump 10.

(Air Removing Tool Attaching Step)

Figure 5:
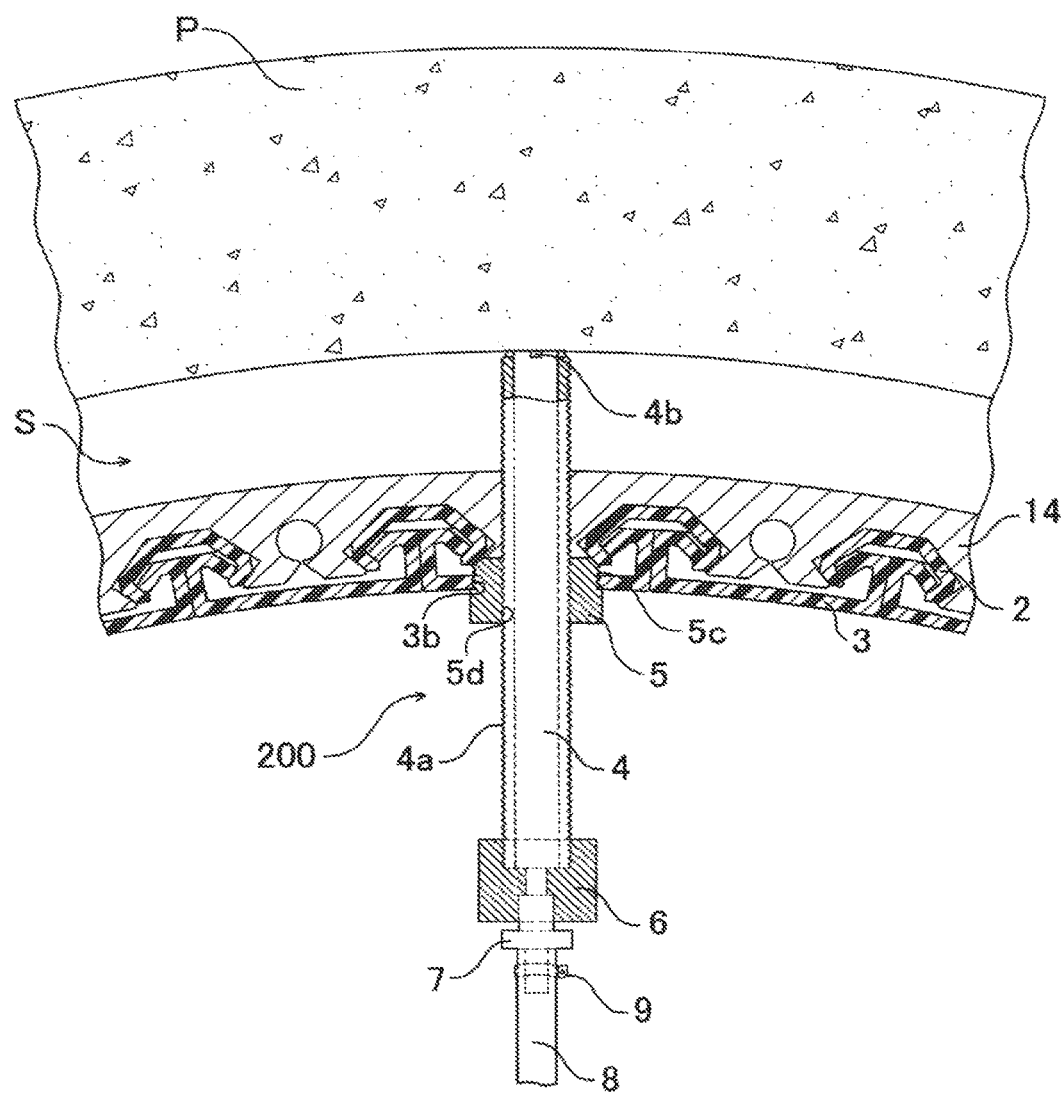
FIG. 5 is an enlarged view of a part B in FIG. 3.

As shown in FIG. 3 and FIG. 5, the one or more air removing holes 3a each having the threaded portion 3b are provided through one or more desired inner surface members 3 out of the inner surface members 3 included in an upper half part of the lining material 100. In this embodiment, the number of the air removing holes 3a bored through the inner surface members 3 is more than one. As for the lining material 100 of this embodiment, it is preferable that each air removing hole 3a is provided between the fitting members 2 so that the threaded nut 5 can be screwed deeply into the lining material 100. The threaded nut 5 will be described later. The air removing holes 3a are bored at constant intervals in the lengthwise direction of the lining material 100. The air removing holes 3a are usually bored on site at positions where air tends to be retained. The air removing holes 3a are bored using a drill, for example. The air removing holes 3a may be bored after or before the lining material 100 is provided in the conduit P. In addition, the intervals between the air removing holes 3a do not have to be constant. The air removing hole 3a may be provided at a position found on site, where air tends to be retained in the gap S.

The threaded nut 5 is attached to each air removing hole 3a. Specifically, the threaded portion 5c provided on the outer circumferential surface of the nut upper portion 5a of the threaded nut 5 is screwed with the threaded portion 3b provided in the air removing hole 3a, and thereby the threaded nut 5 is attached to the air removing hole 3a. The threaded nut 5 is screwed into the air removing hole 3a until the threaded nut 5 comes into contact with the fitting members 2.

The cylindrical body 4 is attached to the threaded nut 5. Specifically, the threaded portion 4a on the outer circumferential surface of the cylindrical body 4 is screwed with the threaded portion 5d on the inner circumferential surface of the threaded nut 5, and thereby the cylindrical body 4 is attached to the threaded nut 5. The cylindrical body 4 is screwed in until its leading end face having the cut grooves 4b comes into contact with the inner circumferential surface of the existing conduit P. In this regard, the cylindrical body 4 may be brought closer to the inner circumferential surface of the existing conduit P from a position near the lining material 100 as injection of the filler material proceeds in a later-described filling step, so that the leading end face of the cylindrical body 4 is finally brought into contact with the inner circumferential surface of the existing conduit P. For example, when a large amount of air and stagnant water remain in the gap S, the leading end face may be held in no contact with the inner circumferential surface of the conduit, and after the amount of remaining air and water becomes small, the leading end face may be brought into contact with the inner circumferential surface. The leading end face of the cylindrical body 4 is orthogonal to the axis of the cylindrical body 4, and the axis of the cylindrical body 4 is oriented in a radial direction going out from the center of the inner circumference of the existing conduit P. As such, the air removing tool 200 is attached to and secured to the lining material 100.

The discharge hose 8 is attached to the other end of the hose nipple 7. A hose band 9 is attached to one end of the discharge hose 8 attached to the hose nipple 7. The hose band 9 prevents the discharge hose 8 from being detached from the hose nipple 7. The other end of the discharge hose 8 may be attached to a vacuum pump (not illustrated).

It is desirable to perform the air removing tool attaching step before the later-described filling step because air in the gap S is smoothly discharged. However, the air removing tool attaching step may be performed during the filling step.

Alternatively, the cylindrical body 4 may be attached to the threaded nut 5 beforehand, and the threaded nut 5 with the cylindrical body 4 may be attached to the air removing hole 3a.

(Filling Step)

As shown in FIG. 2, the filler material is injected into the gap S from the filling pump 10 via the filling hose 11. Filling pressure is on the order of 0.1 MPa to 0.3 MPa. The filler material is gradually injected from a portion of the gap below the lining material 100 to a portion of the gap above the lining material 100. The filler material is, for example, a cementitious material such as cement milk, mortar, and concrete, or thermosetting resin such as unsaturated polyester resin and epoxy resin.

Figure 6:
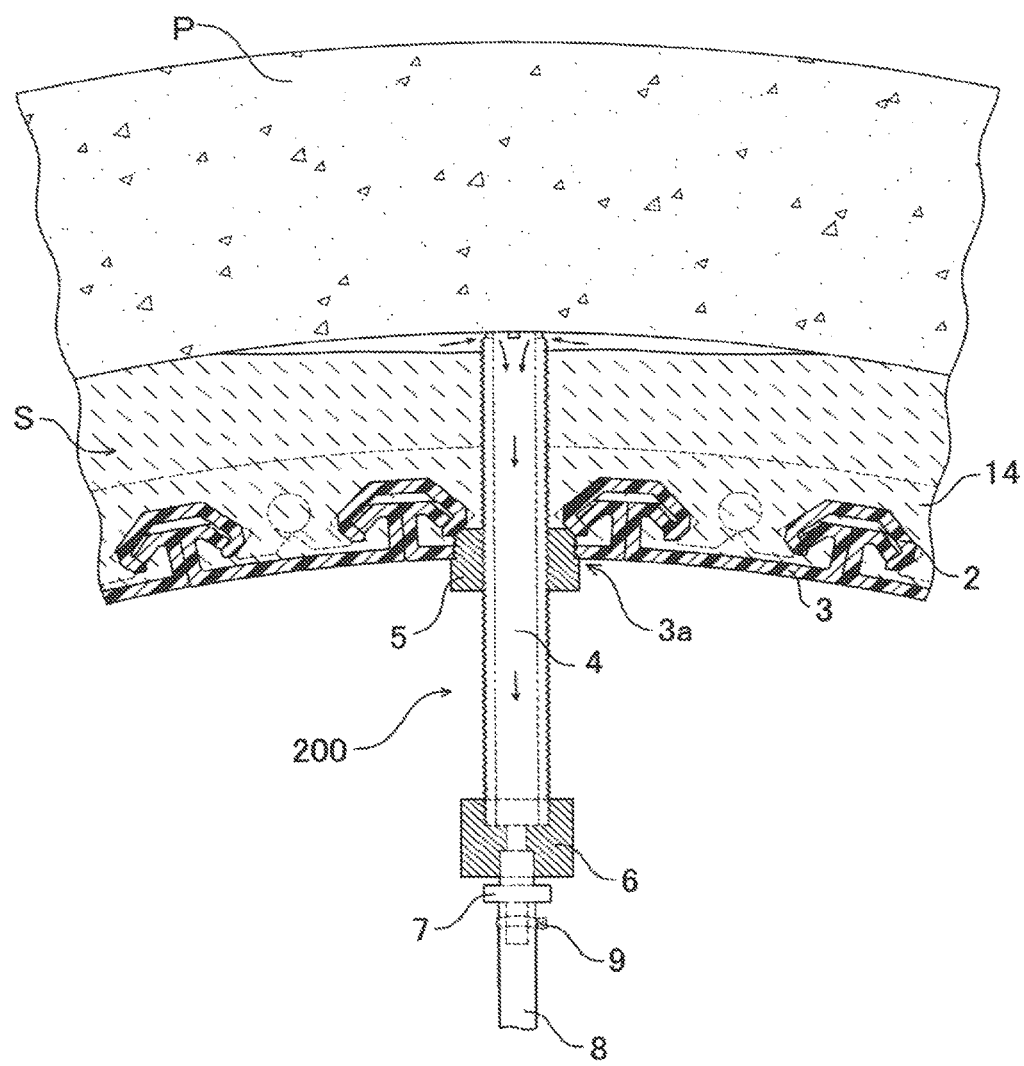
FIG. 6 is an enlarged view of the part B in a filling step.

As shown in FIG. 6, the gap S is filled with the filler material. In this process, air and stagnant water in the gap S are discharged through the cut grooves 4b provided at the leading end face of each cylindrical body 4. The cut grooves 4b are located near the inner circumferential surface of the existing conduit P, and this enables air and stagnant water to be completely discharged from the gap S. Whether the gap S is completely filled with the filler material can be checked by testing whether the fluid discharged from a rear end of the air removing tool 200 is the same as the injected filler material in property. A vacuum pump (not illustrated) may be attached to the air removing tool 200. In this case, the vacuum pump decompresses the insides of the discharge hose 8, hose nipple 7, screw thread adapter 6, and cylindrical body 4, to facilitate the discharge of air and stagnant water.

Figure 7:
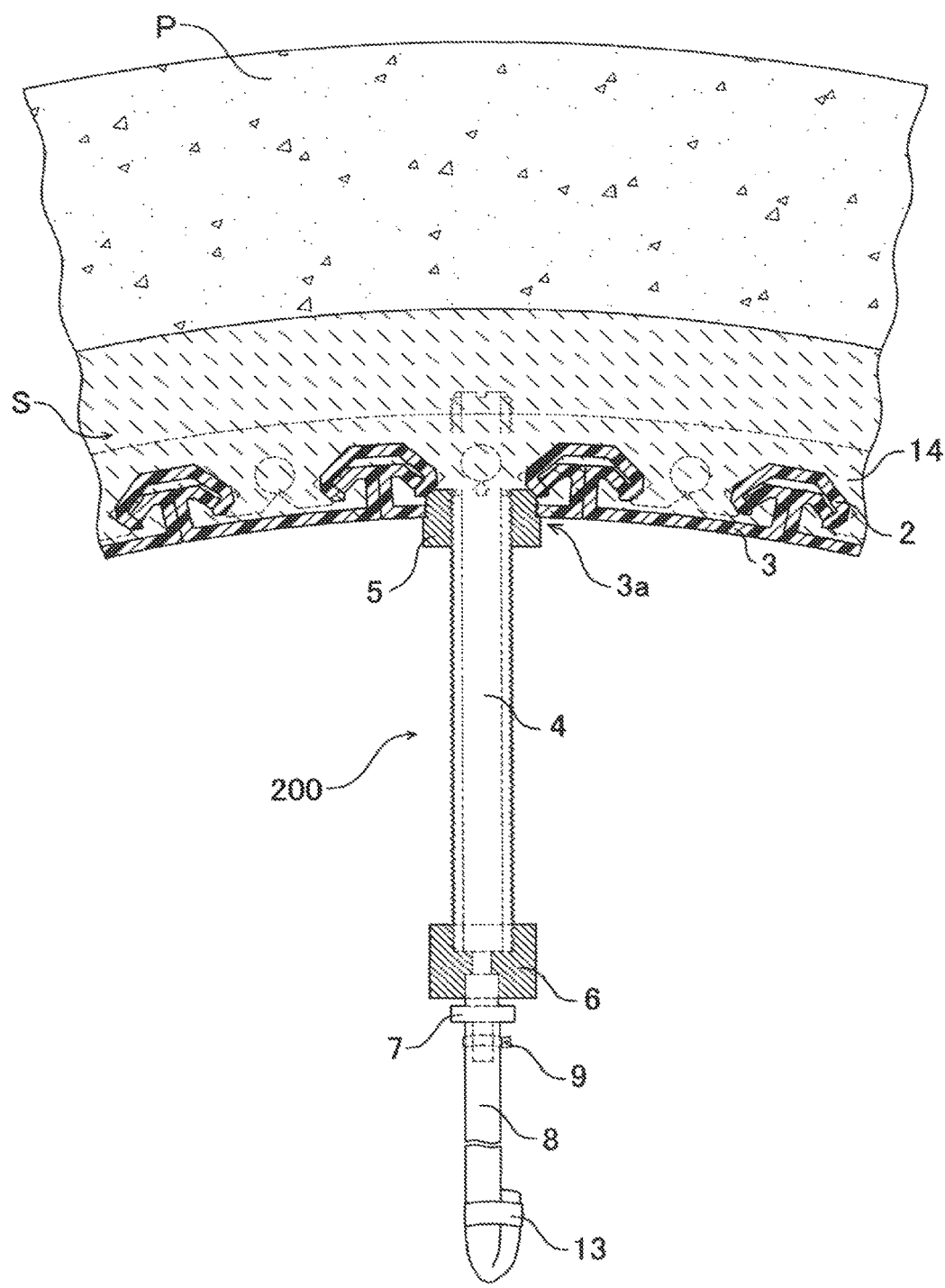
FIG. 7 is an enlarged view of the part B in an additional filling step.

After the discharge of the filler material from the rear end of the air removing tool 200 is confirmed, the discharge hose 8 is bent, and temporarily fixing tape 13 is wound around the bent discharge hose 8, as shown in FIG. 7. Thus, the other end of the discharge hose 8 is closed. Note that the way of closing the other end of the discharge hose 8 is not limited as long as the other end of the discharge hose 8 is closed. For example, the other end of the discharge hose 8 may be closed with a cap (not illustrated). After the other end of the discharge hose 8 is closed, the injection of the filler material by the filling pump 10 is stopped.

(Additional Filling Step)

The cylindrical body 4 is lowered until the leading end of the cylindrical body 4 is level with the air removing hole 3a. The filler material, the amount of which corresponds to the volume of a lowered portion of the cylindrical body 4 is injected into the gap S. The lowered portion of the cylindrical body 4 has a height equal to the distance from the air removing hole 3a to the inner circumferential surface of the existing conduit P. Then, the fill level is checked through pressure management in the gap S. As a result, the gap S is uniformly filled with the filler material, without any hollow.

The following alternative way is also possible: the other end of the discharge hose 8 is not closed in the filling step; the cylindrical body 4 is screwed downward while the filler material is kept being discharged from the rear end of the air removing tool 200; and then the other end of the hose 8 is closed.

A mark may be provided on the outer circumferential surface of the cylindrical body 4 before the filling step to indicate the position to which the cylindrical body 4 is lowered. This makes it easier to lower the cylindrical body 4 so as to be level with the air removing hole 3a.

(Air Removing Tool Detaching Step)

Curing of the filler material is performed. After the filler material is cured, the air removing tool 200 is detached from the air removing hole 3a.

Figure 8:
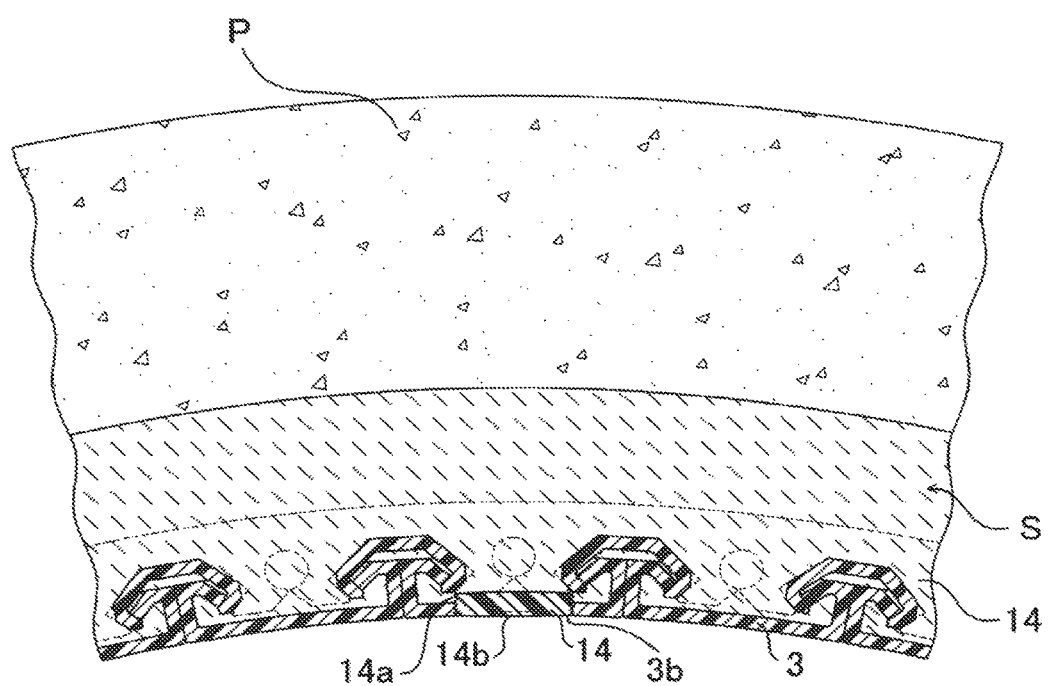
FIG. 8 is an enlarged view of the part B showing the state where an air removing hole is closed by a sealing member after an air removing tool detaching step.

As shown in FIG. 8, the air removing hole 3a is closed by a sealing member 14 after the air removing tool detaching step.

Figure 10:
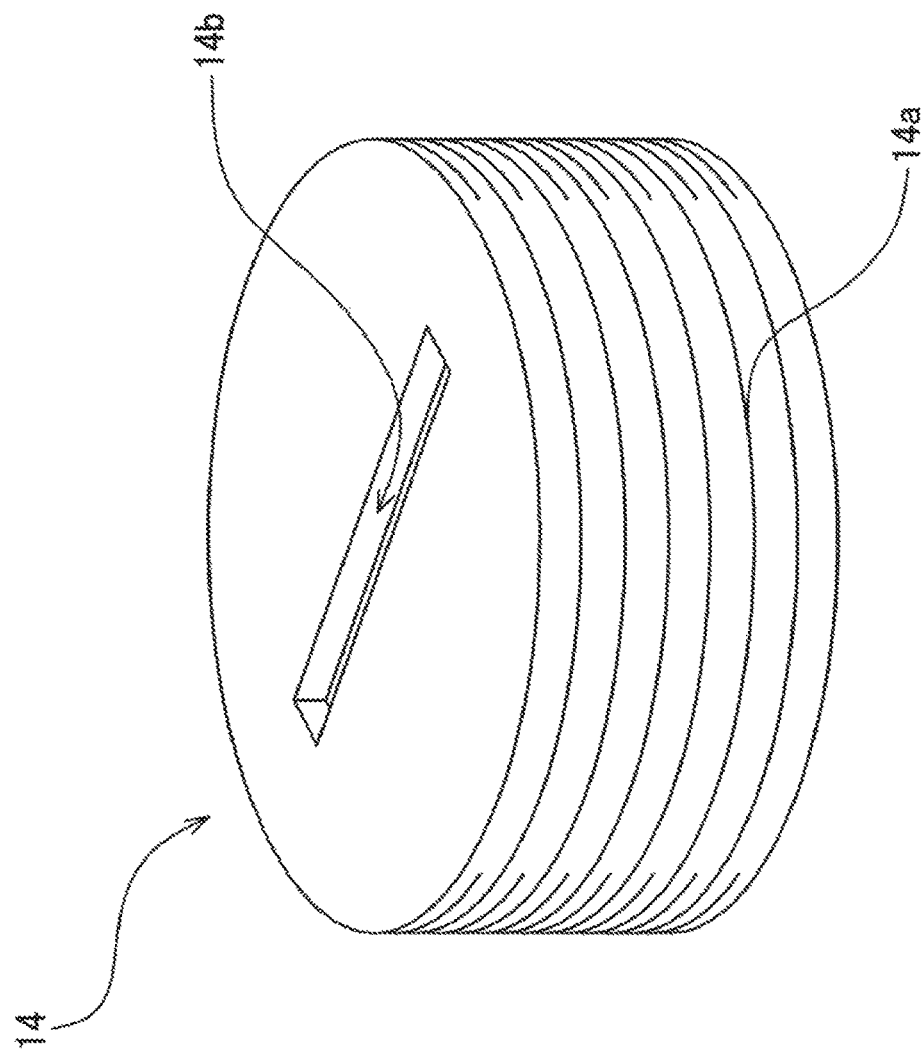
FIG. 10 is a perspective view of the sealing member.

As shown in FIG. 10, the sealing member 14 has, on its peripheral surface, a threaded portion 14a having a pitch the same as that of the threaded portion 3b of the air removing hole 3a. The sealing member 14 is attached to the air removing hole 3a by screwing the sealing member 14 into the air removing hole 3a. It is desirable that the thickness of the sealing member 14 is larger than the thickness of the inner surface member 3. This enables the sealing member 14 to be attached to the inner surface member 3 by screwing the sealing member 14 with the inner surface member 3 throughout the thickness of the inner surface member 3. The sealing member 14 has a slot 14b. This enables the sealing member 14 to be easily attached using a flat-blade screwdriver, for example. Alternatively, the sealing member 14 may have a slot orthogonal to the slot 14b in addition to the slot 14b, for example.

Detachment of the filling hose 11 and the closing of the filling port 12 are performed when appropriate.

(Functions and Effects)

In the present embodiment, the air removing tool is secured with its leading end face being in contact with the inner circumferential surface of the existing conduit P, and the air removing tool includes, at its leading end, the cut grooves 4b through which air is discharged. These features enable air in the gap S to be discharged through the cut grooves 4b before the filler material enters the air removing tool 200. As a result, the gap S is uniformly filled with the filler material, and air in the gap is completely removed. When stagnant water exists in the gap S, the stagnant water is discharged with air, in the same way. Furthermore, by adjusting the depth of each cut groove 4b, the discharge amount per unit time is controllable.

Figure 12:
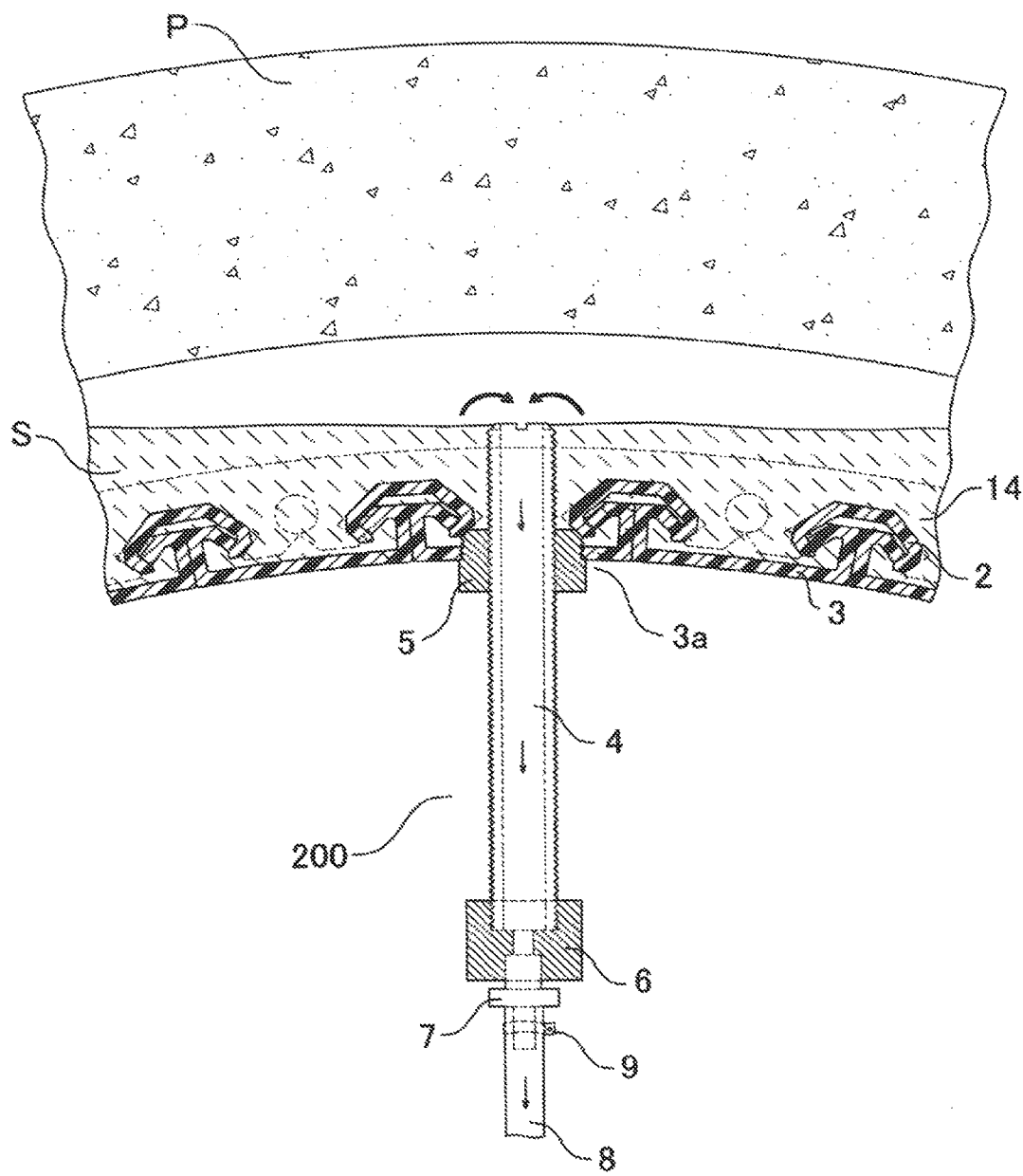
FIG. 12 shows a fill state in which the leading end surface of the air removing tool is located in a gap.

In the present embodiment, the leading end face of the air removing tool 200 may be brought closer to the inner circumferential surface of the existing conduit P during the filling step. When a large amount of air and stagnant water exist in the gap S, it is possible to discharge the air and stagnant water through the opening at the leading end, by holding the leading end face of the tool in no contact with the inner circumferential surface of the existing conduit P, as shown in FIG. 12. This facilitates smooth discharge of the air and stagnant water. The leading end face is brought into contact with the inner circumferential surface of the conduit P after the amount of remaining air and stagnant water becomes small. With this, the air and stagnant water in the gap S are completely discharged through the air removing portion provided at the leading end.

In the present embodiment, after the filling step is completed, the rear end of the air removing tool 200 is closed, and the additional filling step is performed. In the additional filling step, the air removing tool 200 is lowered so that its leading end is level with the air removing hole 3a, and then the filler material is injected into the gap S. The amount of the injected filler material corresponds to the volume of the portion of the air removing tool 200 that is located in the gap S when the tool 200 contacts the inner circumferential surface of the conduit P. As a result, the gap S is uniformly filled with the filler material, without any hollow. This prevents reduction in strength at a portion between the inner circumferential surface of the existing conduit P and the outer circumferential surface of the lining material 100.

In the present embodiment, the air removing holes 3a may be bored through the inner surface members 3 before or after the lining material 100 is provided in the conduit P. Thus, it is possible to change the number of the air removing tools 200, even after the lining material 100 has already been provided in the conduit P. This makes it possible to flexibly address a design change made based on the situation on site. For example, it is possible to open the air removing hole 3a at a portion of the inner surface member 3 opposing a part of the gap S where air tends to be retained.

Figure 11:
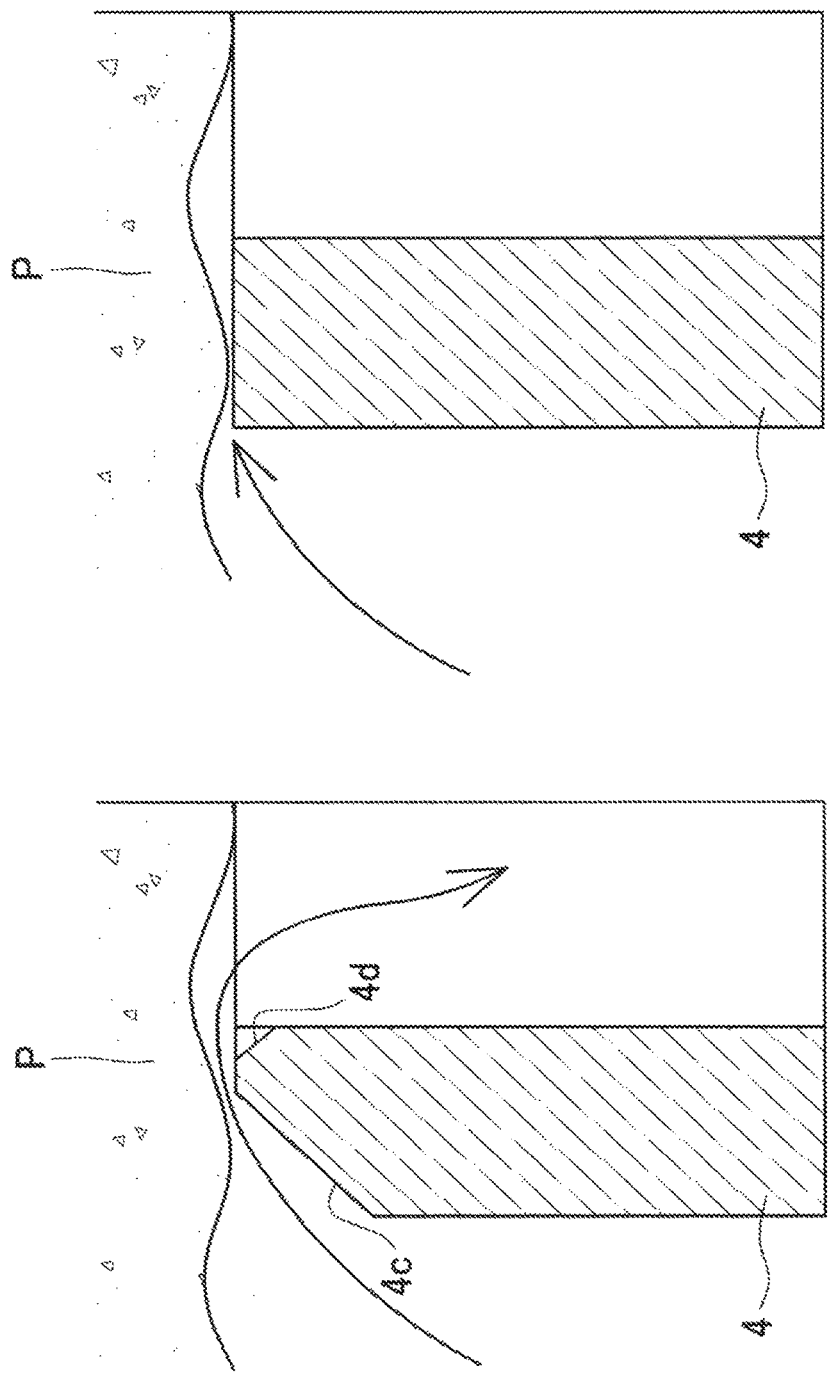
FIG. 11 shows fill states with and without a tapered surface on the outer circumference of a leading end of the air removing tool.

In the present embodiment, the air removing tool 200 has the tapered surface 4c on the outer circumference of its leading end. The inner circumferential surface of the existing conduit P made of concrete or the like is rough. Because of this, there happens to be a natural gap between the inner circumferential surface of the existing conduit P and the leading end face of the cylindrical body 4 of the air removing tool 200 brought into contact with the inner circumferential surface. Now, reference is made to FIG. 11 which shows the present embodiment at the left and a comparative example at the right. In the present embodiment, even a slight amount of remaining air and stagnant water is smoothly introduced into the air removing tool 200 along the tapered surface 4c provided on the outer circumference of the leading end of the cylindrical body 4. It is preferable that the cylindrical body 4 of the air removing tool 200 also includes a chamfer portion 4d inside the leading end face of the cylindrical body 4.

In the present embodiment, the air removing tool 200 includes: the cylindrical body 4 having the threaded portion 4a on its outer circumference; and the threaded nut 5b configured so that its inner circumference is screwed with the cylindrical body 4 and its outer circumference is screwed with the air removing hole 3a. This arrangement ensures high operability of the air removing tool 200 in relation to upward and downward movements in its axial direction. Furthermore, the above arrangement enables the air removing tool 200 to be attached and detached merely using simple tools.

In the present embodiment, each air removing hole 3a is closed by the sealing member 14 after the air removing tool detaching step. This eliminates unevenness on the inner surface members 3 created by the air removing holes 3a. As a result, the flow of water passing through the conduit is not disrupted by the air removing holes 3a.

A preferred embodiment of the present invention has been described. It should be noted that the present invention is not limited to the above-described embodiment and examples, and various design changes, substitutions, and alterations can be made herein without departing from the spirit and scope of the invention as defined by the appended claims.

The above-embodiment deals with the case where the present invention is applied to an underground sewer pipe. However, it is possible to apply the present invention to a secondary liner of a tunnel.

Furthermore, in the above-described embodiment, the lining material 100 includes: the reinforcing body 1 including reinforcing members arranged in the lengthwise direction of the existing conduit P; the fitting members 2 interposed between the reinforcing body 1 and the inner surface members 3; and the inner surface members 3 attached to the inner circumferential surface of the reinforcing body 1. However, the present invention is not limited to this. The lining material may be, for example, a polyvinyl chloride pipe produced by extrusion, which is provided in an existing conduit P.

While the above-described embodiment deals with the case where the cylindrical body 4 is attached to the air removing hole 3a via the threaded nut 5, the cylindrical body 4 may be directly attached to the air removing hole 3a. For example, the following alternative is possible: the cylindrical body 4 has an outer diameter equal to the hole diameter of the air removing hole 3a and has a threaded outer circumferential surface; and the cylindrical body 4 is attached to the air removing hole 3a by screwing the cylindrical body 4 into the air removing hole 3a.

Furthermore, while the above-described embodiment deals with the case where the discharge hose 8 is attached to the hose nipple 7, the discharge hose 8 may be directly attached to the other end portion of the cylindrical body 4, the other end portion having a shape like a bamboo-shoot fitting.

In the above-described embodiment, it has been described that the length of the nut upper portion 5a is preferably longer than the thickness of the inner surface member 3. However, the length of the nut upper portion 5a is not limited as long as the air removing tool 200 is secured to the inner surface member 3 during the operation without being detached from the inner surface member 3.

In the above-described embodiment, it has been described that the thickness of the sealing member 14 is preferably larger than the thickness of the inner surface member 3. However, the thickness of the sealing member 14 is not limited as long as the sealing member 14 is secured to the inner surface member 3 without being detached from the inner surface member 3.

Moreover, in the above-described embodiment, the air removing portion provided at the leading end of the air removing tool 200 is formed by the cut grooves 4b. However, the air removing portion may be formed by one or more holes. Such a hole is provided at a desired location on the tapered surface so as to be orthogonal to the tapered surface.

REFERENCE SIGNS LIST

1: reinforcing body
2: fitting member
3: inner surface member
3a: air removing hole 4: cylindrical body
4a: threaded portion
4b: cut groove
4c: tapered surface
5: threaded nut
5a: nut upper portion
5b: nut lower portion
5c: threaded portion
5d: threaded portion
6: screw thread adapter
14: sealing member
14a: threaded portion
14b: slot
100: lining material
200: air removing tool
P: existing conduit
S: gap

The invention claimed is:

1. A method for filling a gap with a filler material, the gap being between an existing conduit and a lining material provided inside the existing conduit, the method comprising:
   an air removing tool attaching that includes inserting an air removing tool into an air removing hole provided in an upper half part of the lining material, and bringing a leading end face of the air removing tool into contact with an inner circumferential surface of the existing conduit; and
   a filling that includes injecting the filler material into the gap from a filing port provided through the lower portion of the lining material while expelling air from the gap through a leading end of the air removing tool,
   the air removing tool including, at the leading end thereof, an air removing portion through which air is discharged.

2. The method according to claim 1, wherein
   the leading end face of the air removing tool is brought closer to the inner circumferential surface of the existing conduit from a position near the lining material depending on a fill level of the filler material in the filling, and then brought into contact with the inner circumferential surface of the existing conduit.

3. The method according to claim 1, further comprising an additional filling that includes lowering the air removing tool so that the leading end of the air removing tool is level with the air removing hole after the filling is stopped, and then injecting the filler material into the gap, an amount of the injected filler material corresponding to a volume of a portion of the air removing tool that is located in the gap when the leading end face contacts the inner circumferential surface.

4. The method according to claim 1, wherein
   the air removing hole, the number of which is at least one, is bored through the lining material as necessary.

5. The method according to claim 1, wherein the air removing portion is formed by at least one cut groove.

6. The method according to claim 1, wherein
   the air removing tool includes a tapered surface provided on an outer circumference of the leading end of the air removing tool.

7. A method for filling a gap with a filler material, the gap being between an existing conduit and a lining material provided inside the existing conduit, the method comprising:
   an air removing tool attaching that includes inserting an air removing tool into an air removing hole bored through the lining material, and bringing a leading end face of the air removing tool into contact with an inner circumferential surface of the existing conduit, wherein the leading end face is level with the inner circumferential surface of the existing conduit and orthogonal to a lengthwise axis of the air removing tool; and
   a filling that includes injecting the filler material into the gap while expelling air from the gap through a leading end of the air removing tool,
   the air removing tool including, at the leading end thereof, an air removing portion through which air is discharged.

* * * * *